United States Patent Office 3,340,148
Patented Sept. 5, 1967

3,340,148
TREATMENT OF FUNGUS DISEASES
OF THE SKIN
Harry H. Pugh, Chicago, Ill., assignor to Gillette Inhibitor Co., Chicago, Ill., a corporation of Illinois
No Drawing. Filed Mar. 22, 1961, Ser. No. 97,450
6 Claims. (Cl. 167—58)

My invention relates to the treatment of fungus diseases of the skin and to compositions which are highly effective for such purposes.

Numerous types of medication have heretofore been suggested and used for the treatment of fungus diseases of the skin. While at least most of them are useful at least in some degrees, most of them have one or more series objections such as inconvenience or difficulty of application, irritation to the skin areas to which the compositions are applied, unduly prolonged treatment in order to obtain reasonably effective clearing up of the fungus condition, and the failure of the medication to produce satisfactory eradication of the fungus diseases in particularly fractious cases.

My invention is based on the discovery that paratoluenesulfonamide is unusually effective for the treatment of fungus diseases of the skin when applied to the affected skin areas. In practical use, the paratoluenesulfonamide is embodied in a pharmaceutically acceptable carrier. This carrier may take the form of a liquid or, if desired, it may be in the form of a cream, salve or ointment or, for that matter, a powder, and to this end, the various conventional pharmaceutical carriers which are well known in the art as carriers for topical medicinal ingredients can be utilized.

I have found it to be particularly desirable to incorporate the paratoluenesulfonamide in propylene glycol to form a solution therein containing several percent of the paratoluenesulfonamide. Thus, the paratoluenesulfonamide may be admixed with propylene glycol in an amount to produce a solution containing several percent of the paratoluenesulfonamide, for instance, from about 7% or 8% to about 10%, the resulting mixture being heated to not substantially less than 240 degrees F. until the solution is clear. When the paratoluenesulfonamide is applied to the fungus-affected skin area in the form of such a solution, the action of said solution is very gentle and emollient to the skin and, at the same time, the curative effects of the paratoluenesulfonamide manifest themselves highly satisfactorily.

I have also found it to be very satisfactory to incorporate the paratoluenesulfonamide into a formalin solution containing, for instance, from about 20% to 25% or 30% of formalin and from about 3% to 7%, preferably about 5%, of paratoluenesulfonamide. To this end, I mix together the paratoluenesulfonamide with an aqueous solution containing acrylic polymer emulsion solids, formaldehyde, and ammonia. This is conveniently done by admixing from 4 to 8 parts of an acrylic polymer emulsion containing from about 35% to 50% by weight of solids with from 10 to 50 parts of concentrated aqueous ammonia to convert said emulsion to a solution, and then admixing therewith from 6 to 65 parts of aqueous formaldehyde containing from 30% to 45% by weight of formaldehyde, and the desired amount of paratoluenesulfonamide so as to make up a final solution containing from about 3% to 7% of paratoluenesulfonamide, all of the aforesaid parts being by weight.

An illustrative example of such composition is one containing, by weight, 6 parts of an acrylic emulsion (Rhoplex ASE base 75, 46% solids), 34.5 parts of formalin (44% formaldehyde), 25.5 parts of 28% aqueous ammonia, 62 parts of water, and 7 parts of paratoluenesulfonamide. Another illustrative example of this type of composition is one containing, by weight, 8 parts of an acrylic emulsion (Rhoplex ASE base 75, 46% solids), 69 parts of formalin (44% formaldehyde), 51 parts of 28% aqueous ammonia, 60 parts of water, and 10 parts of paratoluenesulfonamide. Such compositions have excellent emollient characteristics in relation to the skin and, at the same time, the compositions function most effectively for the treatment of fungus diseases of the skin.

Numerous tests have been made with compositions prepared in accordance with the present invention. Thus, for instance, in three cases of verruca plantaris, the disease was cleared up at the end of a 16-week period in one case and, in the other cases, substantial improvement was obtained in a period of 12 weeks of treatment. The composition utilized in this series of cases was a 10% solution of paratoluenesulfonamide in propylene glycol. Debridgment was done approximately every 5 days with the aforesaid medication being used 3 times daily.

In a series of three cases of hyperkeratosis, treatment was effected for a 1 week period. Without exception, the skin smoothed out, although on pressure points thickness remained, after which time an emollient was applied to the skin to maintain tissue softness.

Generally speaking, in cases involving the nail, close attention should be paid to debridgment and the application of the medication may be effected desirably by application at intervals as, for instance, 3 to 4 times daily.

In a series of cases where soft tissue problems were involved, a 25% formalin solution containing 5% of paratoluenesulfonamide, prepared as described above, was applied an average of 3 times daily. In such cases, sensible hygiene was employed but no specific procedures such as the utilization of white hose or even changing shoes daily was suggested. Despite this fact, excellent results were obtained in the treatment of fungus diseases.

In hyperkeratotic cases, using an ounce of a formaldehyde solution containing 5% to 10% paratoluenesulfonamide, such as has been described above, to a gallon of water, soaking the affected skin area for a half hour each evening has been found to be efficacious.

In addition to solutions of the type which are described hereinabove, mixtures of propylene glycol solutions of paratoluenesulfonamide and formaldehyde solutions of paratoluenesulfonamide have also been found to be very satisfactory. These solutions are preferably admixed in such proportions as to provide a content of about 4% to 6% of formalin and a content of about 4% to 6% of paratoluenesulfonamide in the final product.

Over and above the advantages which have been pointed out above with reference to the curative effects of the paratoluenesulfonamide in the treatment of fungus diseases of the skin, no instances were found of any allergic responses.

While the invention has been described in detail and illustrated by various examples, it will be understood that various other skin treating compositions can be made embodying therein paratoluenesulfonamide without in any way departing from the principles and fundamental teachings provided herein.

What I claim as new and desire to protect by Letters Patent of the United States is:

1. A process for the treatment of fungus diseases of the skin which comprises applying to the affected skin areas paratoluenesulfonamide in a pharmaceutically acceptable carrier.

2. A process for the treatment of fungus diseases of the skin which comprises applying to the affected skin areas a propylene glycol solution of paratoleuenesulfonamide.

3. A composition for the treatment of fungus diseases of the skin which comprises a clear solution of paratoluenesulfonamide in propylene glycol, said solution containing from about 8 to 10%, by weight, of paratoluenesulfonamide.

4. A composition for the treatment of fungus diseases of the skin which comprises an aqueous solution containing formaldehyde, ammonia, acrylic polymer emulsion solids, and paratoluenesulfonamide.

5. A composition for the treatment of fungus diseases of the skin which comprises an aqueous solution containing, by weight, 4 to 8 parts acrylic polymer emulsion (containing from 35 to 50% by weight of solids), 10 to 50 parts concentrated aqueous ammonia, 6 to 65 parts formaldehyde (containing 30 to 45% by weight of formaldehyde), said composition containing from 3 to 7%, by weight, of paratoluenesulfonamide.

6. In a process for preparing a composition effective for the treatment of fungus diseases of the skin, the step which comprises admixing propylene glycol with paratoluenesulfonamide in amount to produce an 8 to 10% solution of said paratoluenesulfonamide in the propylene glycol, and then heating the mixture to not substantially less than 240 degrees F. until the solution is clear.

References Cited

UNITED STATES PATENTS

| | | | |
|---|---|---|---|
| 1,920,639 | 8/1933 | Haraldson | 167—58 X |
| 1,997,918 | 4/1935 | Steindorff et al. | 167—30 |
| 2,407,668 | 9/1946 | Leatherman | 260—32.8 X |
| 2,764,518 | 9/1956 | Thurmon | 167—58 |
| 2,927,056 | 3/1960 | Gurney | 167—60 |

FOREIGN PATENTS

| | | |
|---|---|---|
| 112,917 | 1/1918 | Great Britain. |
| 499,077 | 1/1954 | Canada. |

OTHER REFERENCES

Abramowitz: Am. J. Pharmacy, July 1942, pp. 250–256.

Baker: Drug and Cosmetic Industry, 54:3, March 1944, pp. 283, 284, 319, 345–357.

Chemical Abstracts (1), vol. 46, entry 676g, 1952 citing Leonard et al., Ind. Eng. Chem. 43, 2338–41 (1951).

Chemical Abstracts (2), vol. 48, entry 11543a, 1954 citing Leonard, Congr. intern. botan., 8, Sec. 21–27, 41–2 (1954).

Dispensatory of the United States of America, 25th ed., pub. by J. B. Lippincott Co., Philadelphia, 1955, p. 1878.

Elastic Sulfa Bandage, Drug and Cosmetic Industry, 53:5, November 1943, p. 563.

Frear: Chemistry of Insecticides, Fungicides and Herbicides, 2nd ed., pub. by D. Van Nostrand Co., Inc., New York, 1948, p. 267.

Frobisher: Fundamentals of Microbiology, 7th ed., pub. by W. B. Saunders Co., Philadelphia, 1962, pp. 18 and 32–34.

Gardilcic: Chem. Abst. 38:6388 (1944).

Greenberg: Handbook of Cosmetic Materials, Interscience Pub., Inc., N.Y. (1954), pp. 132–3.

Hackh: Chemical Dictionary, 3rd ed., pub. by McGraw-Hill Book Co., Inc., New York, 1944, p. 360.

The Merck Index of Chemicals and Drugs, 7th ed., pub. by Merck and Co., Inc., Rahway, N.J., 1960, p. 863.

Modern Drug Encyclopedia and Therapeutic Index, 7th ed., pub. by Drug Publications, Inc., New York, 1958, pp. 1083–1084.

Yonkman et al., Excerpt from American Society of Exptl. Pathology, March 1942, 1 page.

LEWIS GOTTS, *Primary Examiner.*

MORRIS O. WOLK, FRANK CACCIAPAGLIA, Jr.,
*Examiners.*

R. M. GRANIEWSKI, R. HUFF, *Assistant Examiners.*